Feb. 8, 1944. W. E. URSCHEL 2,341,248
CROP STRIPPING AND HUSKING DEVICE
Filed April 9, 1941 6 Sheets-Sheet 1

INVENTOR.
William E. Urschel
BY Cox, Moore & Olson
ATTORNEYS

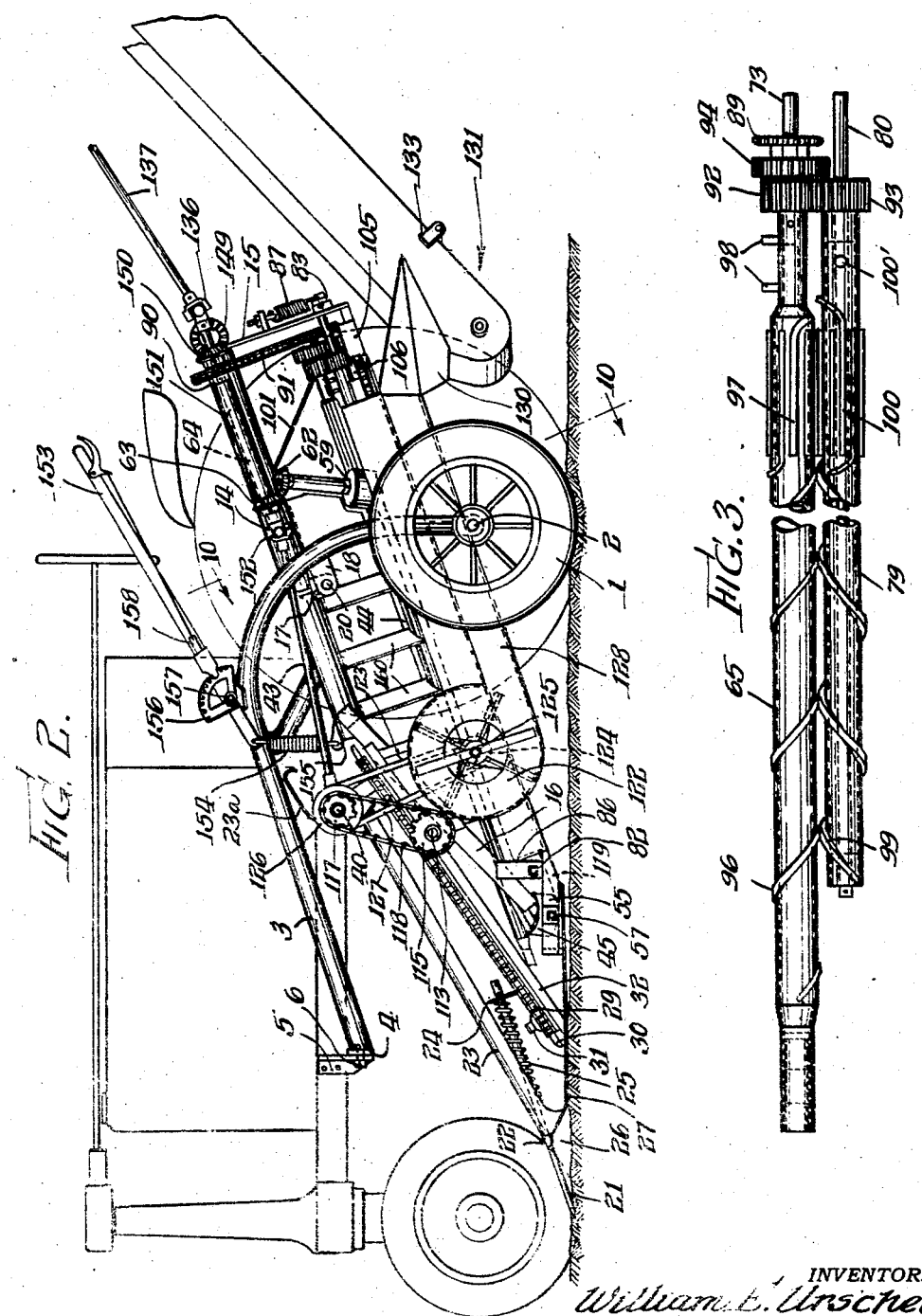

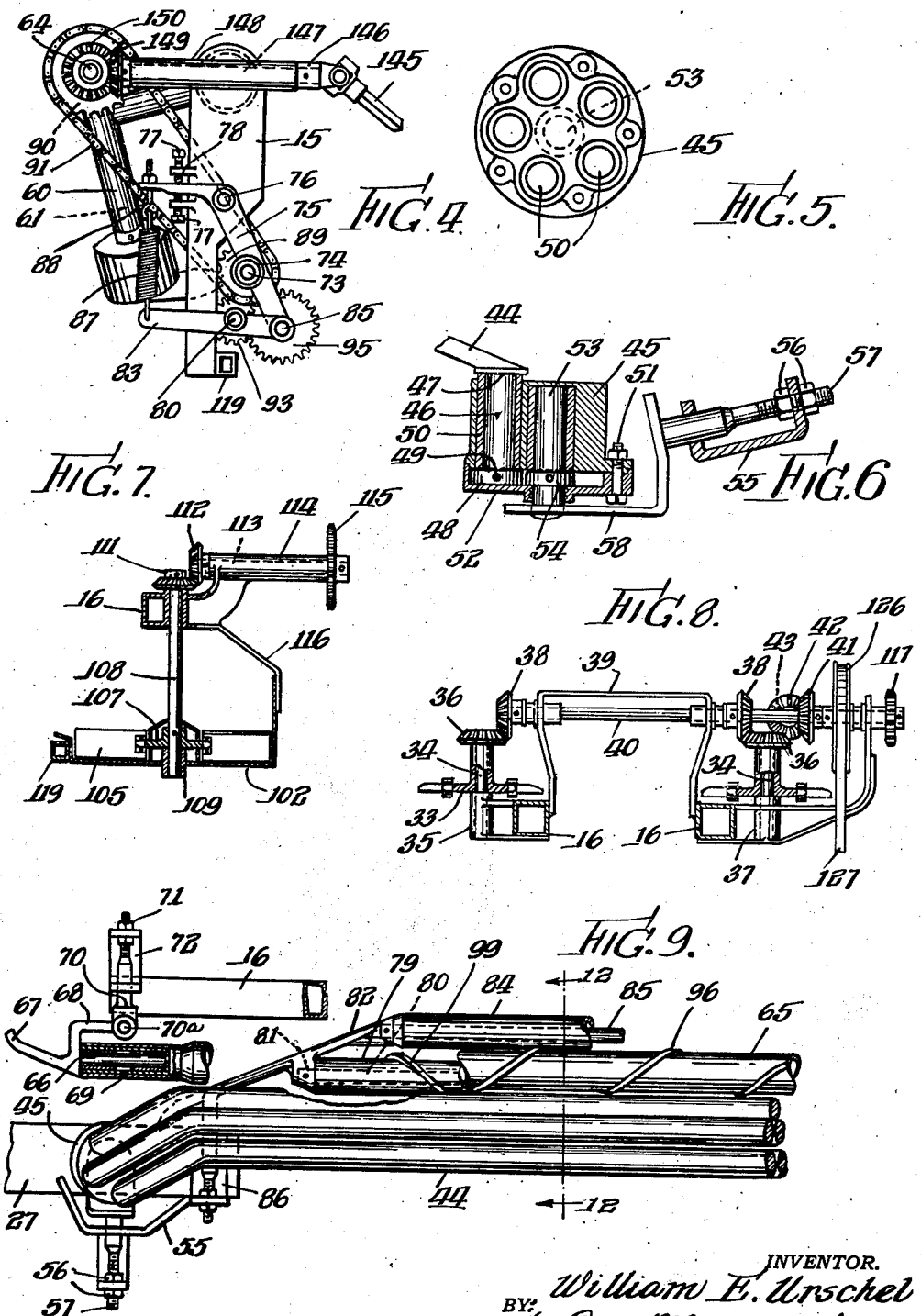

Feb. 8, 1944. W. E. URSCHEL 2,341,248
CROP STRIPPING AND HUSKING DEVICE
Filed April 9, 1941  6 Sheets-Sheet 5

INVENTOR.
William E. Urschel
BY: Cox, Moore & Olson
ATTORNEYS.

Feb. 8, 1944. W. E. URSCHEL 2,341,248
CROP STRIPPING AND HUSKING DEVICE
Filed April 9, 1941 6 Sheets-Sheet 6

INVENTOR.
BY: William E. Urschel
Cox, Moore & Olson
attys.

Patented Feb. 8, 1944

2,341,248

UNITED STATES PATENT OFFICE 2,341,248

CROP STRIPPING AND HUSKING DEVICE

William E. Urschel, Valparaiso, Ind.

Application April 9, 1941, Serial No. 387,605

14 Claims. (Cl. 56—103)

This invention relates to corn pickers and huskers particularly of the type adapted to be moved along rows of corn to snap and husk the ears of corn.

Among the objects of the present invention are to provide a machine of the foregoing character wherein provision is made for recovering and discharging to a desired point the shelled kernels of corn which become loose from the corn ears during the snapping or husking operations; to provide in a machine of the foregoing character means for substantially quickly feeding the standing corn stalk through the snapping and husking mechanism whereby more quickly to bring the ear of corn on the standing stalk into direct contact with the snapping and husking mechanism whereby to effect a quicker separation of the ears from the standing stalks as the machine progresses along the line transversely of the standing stalk; to provide means in addition and supplemental to the mechanism which actually pinches or snaps the ears from the standing stalks, to feed or pull the stalks through and relatively to the snapping mechanism, whereby to provide a speedier ear snapping operation and thereby to increase the speed of travel of the machine along and relatively to the standing corn stalk; to provide in a machine of the foregoing character means for bending the standing corn stalks forwardly and/or downwardly as the machine progresses along and transversely of the standing stalks of corn so as to lower the upper portions of the standing stalks into position such that the ears thereon may be positioned with respect to the snapping and husking mechanism of the machine; to provide in association with the ear snapping and husking mechanism means for diverting or bending the standing stalk in such a manner as to provide for the disposition of a corn kernel receiving means beneath the ear snapping mechanism whereby to catch loose kernels of corn detached from the ears during the snapping and/or husking operations; and to provide in conjunction with the foregoing means for conveying the loosened kernels to a proper discharge point and particularly in association with means for likewise conveying the husked ears to a proper discharge point and/or for discharging the unwanted husks and stalks to a separate discharge point and all during the movement of the machine transversely across the standing corn stalks; to provide in association with means for feeding or pulling the corn stalks downwardly through the snapping and husking mechanism, means for feeding the corn ears, husks and/or stalks longitudinally of the snapping and/or husking mechanism and wherein such longitudinal feeding is effected at a predetermined feed rate and in synchronism with the forward movement of the apparatus with respect to the standing corn and particularly with respect to the rate of travel of the apparatus with respect to the standing stalks from which the ears are to be snapped; to provide in association with means for separating the crop from the standing plant means for bending laterally of the crop detaching mechanism, that portion of the standing plant directly underlying the superior portion of the plant which is approaching and/or is engaged by the crop detaching mechanism, so that appropriate apparatus may be positioned to gather valuable portions of the crop during the actual separation of the crop from the standing plant; and in association with the foregoing object, to provide such bending mechanism with means for assisting in feeding the laterally bent portion of the plant longitudinally of the bending mechanism and preferably in a direction parallel with the travel of the machine relatively of the standing plant whereby to facilitate the feeding operation during the movement of the machine; to provide in association with the means for pulling or feeding the standing plant through or past the crop snapping or separating mechanism, means for ejecting or feeding the broken plants from the machine during the progress of the machine transversely of the standing plants; to provide means in association with the aforementioned feeding means, additional mechanism for dislodging portions of the broken plant or stalks which become lodged in the feeding mechanism in a direction longitudinally of the feeding mechanism; to provide in a machine of the foregoing character retractable gathering points, preferably reciprocably and/or resiliently mounted in the front of the guide shields and arranged to pick up any stalks or plants broken or lying on the ground; to provide such gathering points with blade-like portions for the purpose of preventing weeds or vines from wrapping about the gathering points; to provide gathering points with means to protect the same in case the points strike stones or other immovable objects; to provide a sled-like skid plate for the forward portions of the guide shields at the front of the machine in association with retractable gathering points whereby the points are capable of retraction with the shield housings upon the striking of an obstruction, while at the same time permitting the sled-like skid plate to slide over such obstruction; to provide in association with a pinch bar set of the type disclosed in my prior patents, Reissue No. 20,151, of October 27, 1936, Patent No. 2,152,674, of April 4, 1939, Patent No. 2,214,113, of September 10, 1940, a pair of oppositely driven rolls, one of which is positioned directly opposite the pinch bar set and in a manner to permit the passage of the stalk or plant between said roll and the pinch bar set for the purpose of snapping the crop from the plant or the ear of corn from the stalk, and the other roll positioned adjacent to and directly opposite the first mentioned roll and slightly spaced therefrom to permit the passage of the stalk or standing plant between said rolls whereby when said rolls are oppositely driven in the proper direction they will pull or feed the plant or stalk therebetween and will likewise pull or feed the stalk between the first mentioned of said rolls and the pinch bar set so as to cause the snapping of the ear or crop from the stalk or plant; to provide in combination with the aforementioned structure a third roll associated laterally of the first and second rolls and arranged so as laterally to bend that portion of the plant or stalk below the pinch bar set and the snapping rolls to provide room for the interposition and/or the passage of crop gathering and/or crop conveying mechanism for the purpose of recovering and transporting crop which would otherwise be lost during the crop separating or crop snapping operation as the machine as a whole is transported across the standing plants or stalks; to provide in the aforementioned structure each of the snapping rolls and/or the feed rolls and/or the stalk bending roll with spirally disposed feed members adapted to feed the plant and/or stalk longitudinally of the roll during the crop separating and husking operation; to provide a simple and novel mounting for the front end of the snapping and/or feed roll and particularly in providing the front end of the snapping and/or feed roll with a plant or stalk deflector and/or with means whereby the front end of each of such rolls may be adjusted relatively to the front end of the pinch bar set; to provide the snapping roll and/or feed roll and particularly the rear end of the snapping roll and/or feed roll with longitudinally disposed elongated lugs or means for forcing broken stalks or plants from the machine; to provide an improved rotatable mounting for the front portion of these rolls; to provide the front end of the feed roll, snapping roll and stalk diverting roll with guide means for guiding the stalks or plants between these various rolls and the pinch bars; to provide a self-aligning bearing for the front end of the snapping roll; to provide adjustment means for the snapping roll for positioning the same with respect to the pinch bar to accommodate various types of crops; to provide means for adjusting the rear end of the feed roll with respect to the pinch bar set and/or with respect to the snapping roll; to provide in association with a pinch bar set and a snapping roll disposed in a substantially horizontal plane so as to receive therebetween a vertically disposed standing stalk or plant, a feed roll located substantially below the snapping roll, means for guiding and directing a portion of a standing stalk or vertically disposed plant passing between the snapping roll and the pinch bar set to cause the same to pass between the snapping roll and the feed roll whereby the upper portion of said stalk is fed downwardly through and between the snapping roll and the pinch bar set; to provide in association with the foregoing additional means for laterally bending or diverting a lower portion of the stalk so as to cause it to bend substantially in a horizontal plane as the stalk emerges from between the snapping roll and the feeding roll whereby to permit the positioning of crop receiving means beneath and laterally on both sides of the pinch bar set and the snapping roll so as to catch and gather loosened portions of the crop during the crop separating operation; to provide an improved mounting construction for the pinch bar set, the snapping and husking roll, the feed roll, and the stalk diverting roll, in association with stalk or plant guiding mechanism for automatically guiding the standing stalk between the various rolls to effect the crop separating action; to provide means for adjusting the rear end of the snapping roll, the feed roll, and the stalk diverting roll relatively to the pinch bars; to provide means for conveying dislodged crop or kernels which are disposed parallel to and below the snapping and husking means and are arranged so as to receive the crop or ears of corn and also to receive the loosened kernels or loosened particles of the crop; to provide means to remove stalks or leaves from the ears of corn or the crop and preferably to provide air blast means located in association with the conveying means and preferably thereunder for discharging the lighter unwanted portions of the crop from the heavier portions of the crop while being conveyed to desired points of discharge; to provide appropriate means for feeding and discharging from the machine the ears of corn completely detached from the standing stalks and husked, for gathering and conveying loosened kernels, and for discharging unwanted portions of the crop from the machine and from the gathered portions of the crop; to provide means for controlling and adjusting the angle of the machine with the ground line; to provide resilient or spring means for resiliently and yieldingly supporting the front part of the machine whereby to permit the same to follow the ground contour; to provide a crop separating and/or corn snapping and husking chamber having means positioned to allow the picked ears or portions of the crop to escape onto conveyor means while at the same time retaining broken stalks and weeds within the picking chamber until such stalks or weeds are discharged by the appropriate mechanism, preferably the snapping and husking means; to provide means disposed at the rear of the picking and husking chamber for deflecting weeds or stalks which have traveled the length of the chamber and to discharge such weeds or stalks from the machine; to provide means for positively forcing broken stalks from the machine irrespective of the position of such broken stalks with respect to the axis of rotation of the snapping rolls or feed rolls; to provide an improved chassis for the machine and improved means for mounting the various pinch bar mechanisms, snapping mechanism, husking mechanism, feeding mechanism, conveying mechanism and discharging mechanism; to provide means whereby the gathering, snapping, husking and discharging mechanisms may be attached to the side of a standard tractor in such a way that the relatively tall standing stalks of corn or other plants may be guided properly to the operating mechanism; to provide a corn snapping and husking mechanism for attachment to the side of a tractor and arranged so that the standing row of corn or other crop to be operated upon by the machine will lie between the tractor wheel and a wheel on the attachment; to provide a corn snapping and husking mechanism in the form of an attachment adapted to be pivotally connected to the side of a standard tractor and to be operated by a power take-off from the tractor, such machine including a single wheel and a chassis having upwardly arching members adapted to be connected to the side of the tractor so as to permit the plants or stalks of corn being operated upon by the machine to pass between the tractor and the wheel of the machine; to provide a corn snapping and husking apparatus carrying one ground wheel and having means for attachment to the side of a tractor; to provide a new and improved means to snap an ear of corn from a standing stalk by relatively smooth snapping means and coacting feeding means which do not come in contact with the ear of corn and which aggressively and positively feed the stalks through the machine and in the manner to reduce shelling of the kernels of the corn to a minimum; to provide a machine of the foregoing character which allows other snapped ears of corn to escape from the snapping and husking chambers onto conveying means where the stalks and trash are retained in the snapping and husking chambers until discharged from the machine by the snapping and husking means; to provide these and other objects of invention as will be apparent from a perusal of the following specification when taken in connection with the accompanying drawings.

Referring now to the drawings:

Figure 2 is a side elevation of such machine;

Figure 3 is a side view showing the crop or ear corn snapping mechanism;

Figure 4 is a side view of the snapping rolls and pinch bar drive and support;

Figure 5 is a top view of the pinch bar bearing head;

Figure 6 is a front view partly in section of the front pinch bar head support;

Figure 7 is a front view partly in section showing the conveyor drive;

Figure 8 is a front view partly in section of the gathering chain drive;

Figure 9 is a fragmentary top view of the front end of the pinch bars and snapping rolls, parts being broken away to illustrate the details;

Figure 1:
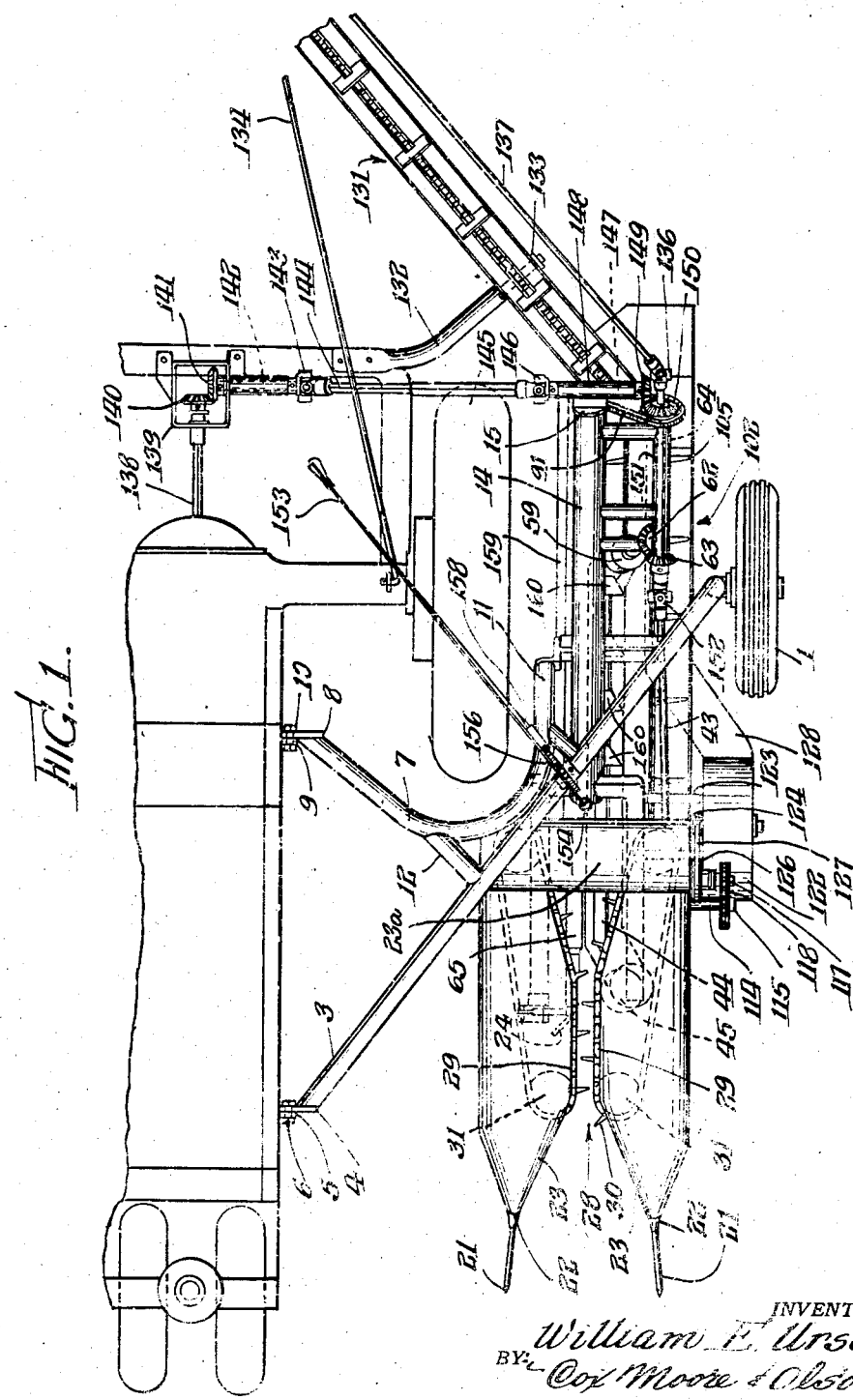
Figure 1 is a plan view of one embodiment of the machine incorporating the invention therein.

Referring now to the drawings in detail, it is to be understood that the machine herein illustrated is the preferred form of the invention and is used for purposes of illustration but not by way of limiting the scope of the claims since the claims themselves define the invention.

In Figures 1 and 2 of the drawings the machine is disclosed as comprising a main frame adapted to travel along the ground and supported on one side by a ground wheel 1 and on the other side by the frame of a suitable tractor, preferably any type of standard tractor. The ground wheel 1 is rotatably mounted on a stub axle 2 which is secured in a tubular frame member 3. This latter frame member projects upwardly and curves forwardly to the front end of the tractor frame whereat its terminates in a hinged plate 4.

Figure 10:
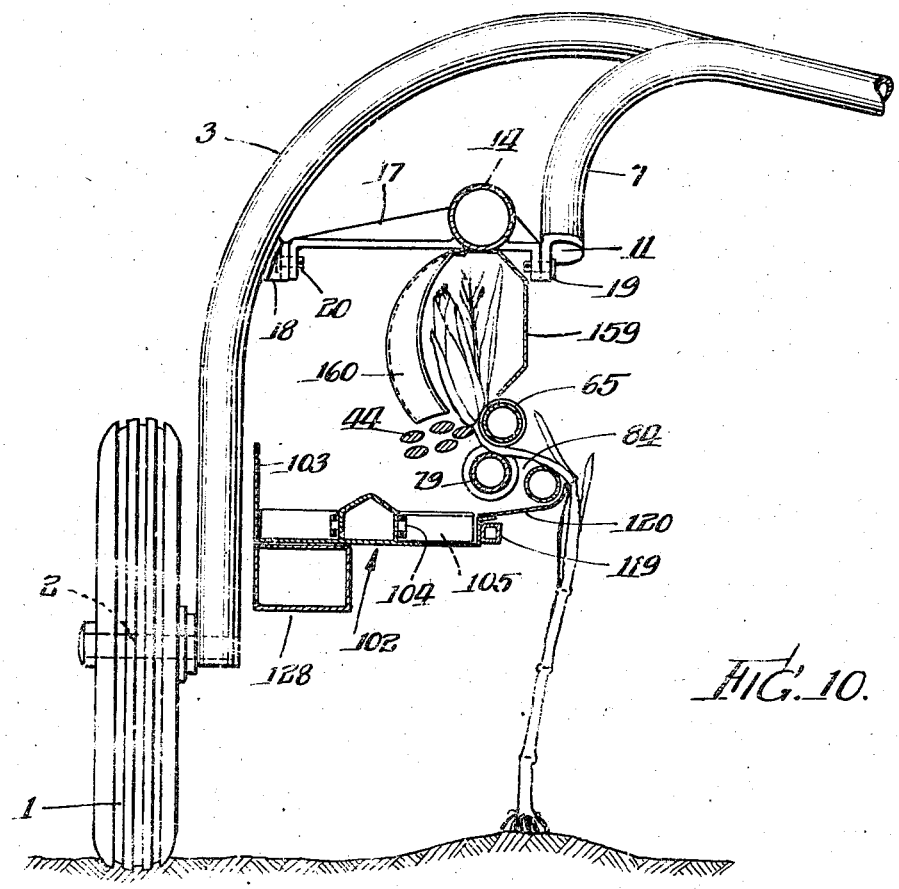
Figure 10 is a transverse sectional view taken on line 10—10 of Figure 2.
Figure 11:
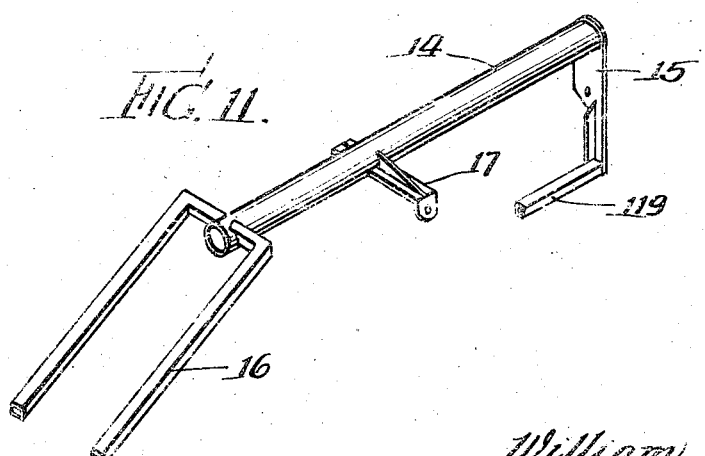
Figure 11 is a perspective view of the main frame.

The manner of the upward and lateral curvature of this frame member 3 is shown in Figure 10 and the arrangement is such that the frame 3 will overlie the top of the standing crop as the machine passes along the crop row or as hereinafter will be more fully explained.

Frame member 3 is hinged to bracket 5 which in turn is secured to the tractor frame by bolts 6. Another tubular frame member 7 is hinged to a bracket 9 in turn secured to tractor frame by bolt 10. This frame member 7 extends from the hinge plate 8 to frame member 3 and thence extends rearwardly terminating in a bracket 11 to which one side of the picker frame is hinged. Braces 12 and 13 secured between frame members 7 and 3 by welding or otherwise stiffen and hold the two frame members rigidly together.

As shown in Figures 1, 2, 10 and 11, the picker frame comprises a main preferably tubular member 14 which has secured to its rear end a rear roller support 15. This support 15 supports the rear end of the snapping rolls and terminates at the front end in a fork 16 to support the front end of the snapping rolls and pinch bars hereinafter referred to. This support is shown in detail in Figures 2 and 11.

Near the central portion of the main member 14 is secured a transverse bracket 17 (see Figure 11) which is pivotally mounted on the main frames 3 and 7 between brackets 11 and 18 by means of pivot pins 19 and 20. This is shown in Figure 10.

The front of the machine is provided with guide shields and also with gathering points for the purpose of picking up any stalk that may be broken or that may lie on the ground and for directing such stalks or portions of stalks to the mechanism hereinafter described. In addition, the fronts of the guide shields are provided with retractable gathering points 21. As shown in Figure 1, these gathering points are reciprocally mounted in the foremost tapered portion 22 of the guide shields 23 and the brackets 24.

In addition, in order to prevent weeds and vines from wrapping around the gathering points, the same are provided with blade-like portions 26.

In order to protect the various parts from damage in case the gathering points strike a stone or substantially immovable object, the gathering points are urged normally outwardly by springs 25 which allows the gathering points to retract within the guide shields 23 on contact with an obstruction while at the same time the sled-like skid plate 27 formed as a part of the bottom portion of the guide shields 23 permits the machine to slide over the obstruction without damage. These gathering points serve to guide the standing and broken corn stalks between the guide shields 23 into the throat 28 therebetween where the stalks may be acted upon by means for directing the same relatively rearwardly of the machine into the snapping and husking means. This stalk directing means preferably comprises fingers 30 disposed on gathering chains 29.

The lower end of the gathering chains 29 are adapted to idle on sprockets 31 supported in any conventional manner on the gathering boards 32 (see Fig. 2). Chains 29 are driven by sprockets 33 (see Figure 8) secured to the hub of beveled gears 36 and which gears are rotatably mounted on stub shafts 34 secured in the brackets 35 mounted on each side of the arched frame-like member 16. Beveled gears 36 are driven by beveled gears 38, which latter are pinned to a shaft 40. This latter shaft is suitably journalled in a bracket 39. The beveled gear 41 is mounted securely on shaft 40 and is driven by a beveled gear 42 which in turn is mounted on the foremost end of a shaft 43, the drive of which will be hereinafter described.

These gathering chains 29 guide the corn stalks between the picking unit preferably comprised of the pinch bar set on one side and an oppositely disposed roller or member on the other side.

The construction of the pinch bars 44 is described and claimed in detail in my prior patents aforesaid.

Referring to Figures 5 and 6, of the present drawings, the lower end of the pinch bars is journalled in a lower bearing head 45 and this lower end of the pinch bars has an extension 46 journalled in bearing head 45 and positioned by shoulders 47 and collars 48 secured on the end of extensions 46 by pins 49. In order to provide a suitable bearing surface bushings 50 are inserted in the bearing head 48 and dust and dirt are excluded from the bearing by a collar plate 52 which is fastened to the bearing head 45 by bolts 51. This bearing head 45 is journalled on a stud 53 fixed on a holder 58 and the bearing head 45 is positioned on stud 54 by a collar which is pinned to said stud. Holder 58 is mounted in a bracket 55 secured to the skid plate 27 and arched frame 16. Nuts 56 on threaded portion 57 of the holder permit the adjustment of the pinch bar set so that it may be positioned to suit the various conditions of the crop.

The rear bearing head 59 is similar to the front bearing head 45. This rear bearing head is secured to the lower end of drive shaft 61 by a pin. Drive shaft 61 in turn is journalled in a bearing bracket 60 attached to the tubular frame member 14. Gears 62 fixed on the upper extremity of shaft 60 driven by gear 63 pinned on shaft 64.

Combined snapping and husking means, preferably in the form of roller 65, cooperates with and is mounted oppositely to and approximately parallel with the pinch bar set 44. The front end of the snapping and husking roller 65 is rotatably mounted on a stud 66 secured fixedly in a bracket 68 (see Figure 9). A bearing cartridge 69 is securely mounted in the front end of roller 65 to thereby provide a proper bearing surface.

Means for guiding the stalks between the roller 65 and the pinch bars 44 is provided in the form of a guiding finger 67 extending forwardly from the bracket 68. The bracket 68 is pivotally mounted on a pin 70a and clevis 70 which in turn is mounted in bracket 72 secured to the arched member 16. This arrangement provides a self-aligning bearing for the front end of snapping roller 65.

Through the instrumentality of nut 71 on the threaded portion of clevis 70 the snapping roller 65 may be positioned to work most effectively in accordance with the various conditions of the crop. The rear end of the snapping roller 65 terminates in a stub shaft 73 journalled in bearing 74 mounted in an arm 75 as shown in Figures 3 and 4. This arm 75 is pivotally mounted on a stud 76 which is secured in the rear roller support 15. Adjustment of the arm 75 is effected by the screws 77.

While the pinch bar set in coaction with the snapping and husking roll effects a limited amount of downward feed of the stalk through and between the pinch bar set and the snapping and husking roll the main downward feed of the stalk or plant is effected by additional means. To this end a feeding roller 79 is mounted substantially parallel to and beneath the snapping and husking roller 65. This feeding roller is rotatably mounted on a stationary shaft 80, the front end of which is secured in the lug 81 projecting from the combined stalk guide and supporting bracket 82. The rear end of the stationary shaft 80 is supported by a secondary arm 83. The feeding roller is driven approximately at the same speed as the snapping and husking roller and, as shown by the drawings in Figure 12, in opposite directions relatively thereto.

Means is provided for laterally and substantially horizontally diverting that portion of the standing stalk or plant which lies beneath or is lower than that portion of the standing stalk or plant which is engaged between the pinch bar set and the snapping and husking roll. Mounted parallel to and at the side of the feeding roller 79 is a stalk diverting roll 84 rotatably mounted on stationary shaft 85 which is supported at the front end in the stalk guide bracket 82. This stalk bracket 82 extends forwardly to be supported under the pinch bar set by an extension 86 of the bracket 55. The rear end of shaft 85 is supported in an arm 75 and projects through said arm 75 sufficiently to provide a pivotal mounting for a secondary arm 83. A spring 87 hooked to the lower end in secondary arm 83 and at the upper end in a hook bolt 88 maintains an even and an adjustable pressure between the snapping roll 65 and the feeding roll 79. The three rollers may be adjusted at the rear in respect to the pinch bars by means of set screws 77 in lugs 78 projecting from the rear roller support 15.

Sprocket 89 fastened to stub shaft 73 of the snapping roller 65 is driven by sprocket 90 through a chain 91. This is shown in Figures 3 and 4. Sprocket 90 is keyed to shaft 64 and the drive thereof will be hereinafter described. Gear 92 is keyed to stub shaft 73 of snapping roller 75 and drives a gear 93 which is secured to the feeding roller 79, whereby to rotate said feed roller 79 at approximately the speed of the snapping roller 65. Gear 94 which is keyed to stub shaft 73 of the snapping roller 65 drives a gear 95 affixed to the stalk diverting roller 84.

By laterally diverting that portion of the stalk below the stalk portion which passes through and between the pinch bars and the snapping roll and between the snapping roll and the feeding roll, room is provided for gathering means for catching and saving desired portions of the crop which may be loosened and dislodged by the snapping and husking operation. In the case of snapping ears of corn from standing stalks, this gathering means will effect a saving of the loosened kernels.

In the preferred embodiment I provide a conveyor 102 (see Figures 2, 12 and 13) which is positioned parallel to and below the snapping and husking means to receive not only the ears of corn but the dislodged kernels. This conveyor 102 may be of any desired construction. As shown it is of conventional type comprising a trough 103, a flight of chain 104 and conveying paddles 105 riveted to projections on the chain lengths.

The rear end of this chain idles on a sprocket 106 secured in any conventional manner in the trough 103 and the chain is driven at the forward end by a sprocket 107, as shown in Figure 7. Sprocket 107 is pinned to a vertical shaft 108 journalled at the lower end in a bearing 109 and at the upper end in a bearing 110. This bearing 110 is secured to the arched frame member 16. A beveled gear 111 is pinned to the upper extremity of shaft 108 and is driven by beveled gear 112 pinned to shaft 113, which shaft is journalled in the bearing bracket 114. This latter bracket is attached to the arched frame member 16. Sprocket 115 is pinned to shaft 113 driven by sprocket 117 through the instrumentality of chain 118. Sprocket 117 is mounted securely on shaft 40, the drive of which has hereinbefore been explained.

One side of the conveyor 102 is supported by a longitudinal frame or member 119, preferably formed of square tubing and which is fastened to the rear roll support 15 at the rear end and at the forward end to the skid plate 27. The other side of the conveyor or receiving or gathering member is supported by brace 116 depending from the bracket 114. A kernel pan or gathering pan 120 is secured to the conveyor 102 and extends the length of the conveyor. It is shown as positioned under the snapping and husking means so as to collect the shelled kernels and guide them into the conveyor 102. A chain guide 121 in the trough of the conveyor guides the chain and also positions the ears in front of the paddles.

Means is provided to remove what is known as the trash which in the present instance consists of pieces of weeds and stalks or leaves from the ears of corn or where other crops are being harvested, from the particular plants from which the crop is harvested. This means comprises an air blast projected through the crop or corn by a conventional type of fan 122 mounted at the side of the conveyor as shown in Figures 1 and 2. This fan is mounted by means of hangers 123 which are secured to the arch member 16. Pulley 124 mounted on the fan shaft 125 is driven by a second pulley 126 pinned to the shaft 40 and driven by means of the belt 127. An air duct carries the air blast under the conveyor to the point where the corn is discharged.

Picked ears of corn and kernels are carried by the conveyor 102 and are discharged into chute 130 from which the ears or kernels slide into a standard wagon elevator 131. This wagon elevator is positioned in angular relation to the picker in order to discharge the ears of corn into a wagon or other carrier trailing behind the tractor. The wagon elevator 131 is mounted on an elevator support 132 which is bolted to the tractor draw bar. Brackets 133 secured to the side of the wagon elevator 131 have apertures at the lower end to receive the elevator support 132. Braces such as 134 (see Figure 1) attached to the upper end of the elevator and hooked to the rear axle of the tractor hold the elevator rigidly. The elevator 131 is driven by a shaft 137 which extends from the universal joint 136 disposed at the rearmost portion of shaft 64. This shaft 137 extends to the head shaft, not shown, of the elevator and which head shaft is driven by shaft 137 through a common arrangement of beveled gears.

A power take-off shaft 138 connected at the front end by a splined coupling to the take-off shaft of the tractor extends rearwardly to a suitable journal in gear housing 139 bolted to the draw bar of the tractor, thus providing means for rotating the various mechanisms of the machine. Bevel gear 140 pinned to the rear extremity of take-off shaft 138 drives a gear 141 pinned to a transverse shaft 142 which is journalled in the gear housing 139. This transverse shaft is flexibly connected to shaft 147 by means of a standard universal joint comprised of a universal joint 143 mounted on a shaft 142, a square shaft 144 adapted to slide in a square tube 145 and a second universal joint 146 on said square tube 145. This arrangement of driving means permits the machine to adjust itself to the uneven contour of the ground.

Shaft 147 is journalled in bearing 148 mounted on rear roller support 15. Beveled gear 149 is pinned to shaft 147 and drives a second beveled gear 150 secured to a shaft 64 which in turn is journalled in the bearing bracket 151. This latter bearing bracket is secured to the tubular frame 14. Shaft 64 drives shaft 43 through the universal joint 152. The various mechanisms of the machine are driven from shaft 64 as hereinbefore explained.

Means is provided for controlling the angle of the machine with respect to the ground line and the same comprises a hand lever 153 mounted on the main frame member 3 within reach of the operator when on the seat of the tractor. Tension spring means 154 hooked in an ear 155 of the tubular frame member 14 also hooks into the hand lever 153. This method of supporting the picking unit allows the front end of the machine to follow the contour of the ground. A segment 156 bolted to the main frame member 3 holds a stud 157 on which the hand lever 153 is pivotally mounted. A detent 158 cooperating with the notched segment 156 maintains a hand lever 153 in any desired position.

Figure 12:
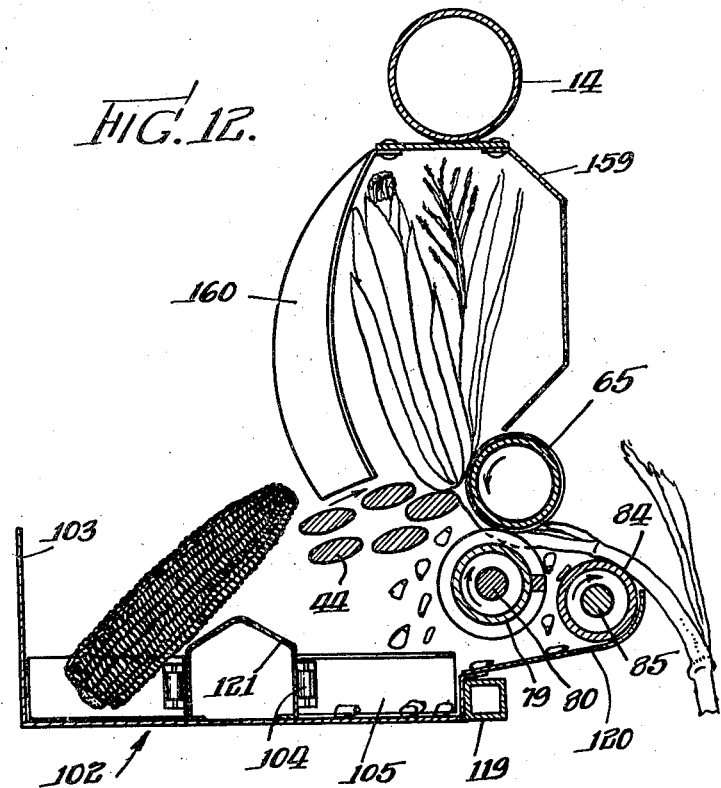
Figure 12 is an enlarged transverse sectional view of the snapping and husking mechanism and conveyor illustrating the operation of the machine.
Figure 13:
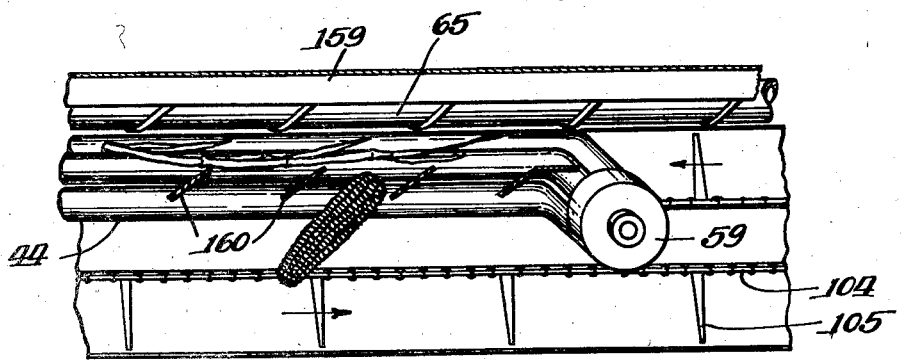
Figure 13 is a fragmentary plan view of the snapping and husking chamber.

The frame proper is provided with a picking and husking chamber. As shown in Figures 12 and 13, this is formed over the snapping and husking means by means of a side member 159 and cooperating curved vanes 160. The latter are bolted or riveted to the tubular frame member 14. These vanes 160 are positioned to permit the picked ears of corn to escape into the conveyor 102, while at the same time retaining broken stalks and weeds within the picking chamber until the stalks and weeds are discharged from the machine by the snapping and husking means. In this connection a shield 101, as shown in Figure 2, is fixed in an angular position at the rear end of the picking chamber to deflect the stalks and weeds which have traveled the length of the picking chamber, so as to cause them to be discharged from the machine through the two rollers 65 and 79.

Means is provided for positively forcing broken stalks from the machine, and this preferably comprises bars 97 and lugs 98 and rollers 65 and bars 100 and lugs 100' on rollers 79. It will be noted that the longitudinally disposed bars 97 and 100 are arranged to grip broken pieces of stalks therebetween and force them downwardly between the rolls, thereby discharging the stalks. It will likewise be noted that the lugs 98 and 100' are arranged so that should stalks or plants lodge lengthwise of the rolls 65 and 79 these lugs will likewise force such stalks and plants downwardly and cause them to pass through and between the two shafts.

In the operation of the machine, as the tractor propels the machine longitudinally of one or more rows of corn, it can be seen that the tractor wheels will ride along the space intervening between the rows and that the ground wheel 1 will ride along the space intervening between the next adjacent row and the row to be operated upon. The arch bars arching over the row or rows of plants to be snapped and husked are carried by reason of the pivotal mounting 6, 10 and 11. Any uneven contours of ground are readily taken care of by such hinged connections so that the picking machine may adjust itself readily with respect to the tractor proper.

As the machine moves along the rows of corn, the points 21 are on each side of the row and as the machine advances, stalks of corn are guided towards the throat 28 where the fingers 30 of the gathering chains 29 contact the stalks and urge them rearwardly until they are engaged between the pinch bars 44 and the snapping and husking roller 65. The stalks are urged rearwardly and also downwardly by the combined action of the pinch bars 44 and the roller 65. The amount of downward movement on the corn stalks due to the action of the pinch bar and the roller 65 is relatively minor as compared with the downward movement caused by the feeding roller cooperating with the snapping and husking roller 65, as will be hereinafter explained.

As before noted, the snapping roller 65 is provided with a relatively shallow spiral lead 96 used to cooperate with pinching bars in moving the stalk rearwardly. As the stalks are moved rearwardly simultaneously with the forward movement of the tractor and the machine, the stalks come in contact with the stalk guide 82 (see Figure 9) which serves to guide the butt of the stalks between the snapping roller 65 and the feeding roller 79. This in turn further assists the pinch bars and the snapping roller in moving the stalks rearwardly and downwardly. The feeding roller 79 has a comparatively heavy spiral lead 99 registering and coacting with the spiral lead 96 of the snapping roller 65 and this spiral lead 99 assists in the longitudinal rearward movement of the stalks relatively to the snapping roller and the feeding roller. The direction of rotation of the rollers and the pinch bars may be seen in Figure 12.

As the machine moves along the ground, upstanding stalks are directed between the snapping roll 65 and the pinch bars 44. Due to the downward inclination of the pinch bars, the snapping roll and the feed roll and due to the spiral on the snapping roll and on the feed roll, as the machine moves forwardly in engagement with the lower portion of upstanding corn stalks, the same being then between the pinch bars 44 and the snapping roll 65, the pinch bars and the snapping roll are power driven to move the stalk rearwardly with respect to the machine at approximately the same rate that the machine is moving forwardly with respect to the standing corn stalk.

There is somewhat of a downward pull on the corn stalks due to the combined operation of the pinch bars and the snapping roll. In addition, due to the inclination of the pinch bars and the snapping roll, as the machine moves forwardly the snapping rolls and pinch bars will pinch higher and higher surfaces on the corn stalk, and the corn stalk is also moved rearwardly with respect to the pinch bars and snapping roll by the spiral arrangement on the snapping roll.

Figure 14:
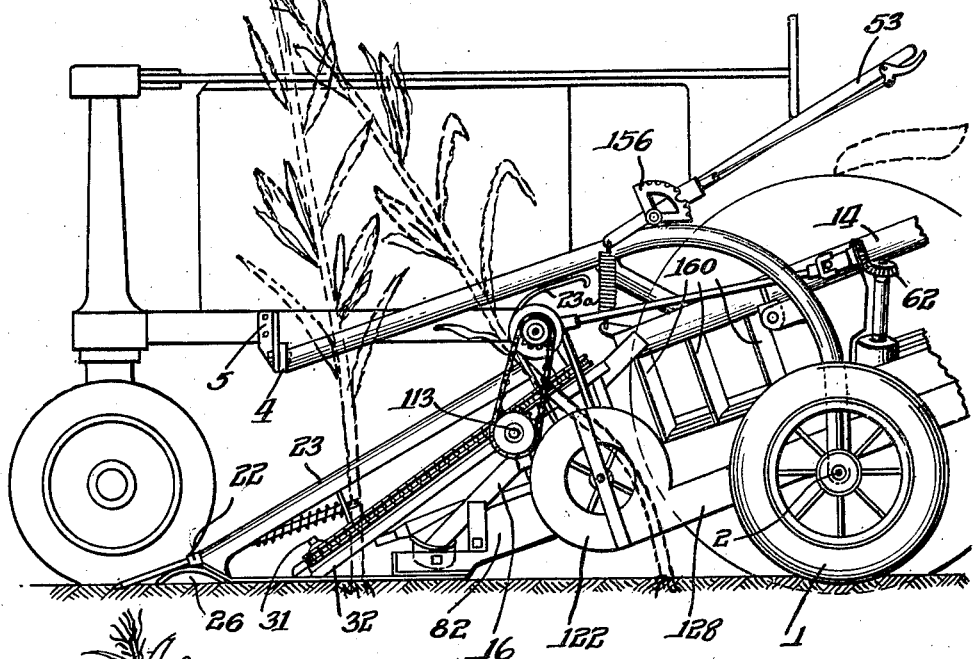
Figure 14 is a side view of the machine similar to Figure 2, with the rear portion broken away to show the action of the machine as it progresses through a row of corn stalks to be treated.
Figure 15:
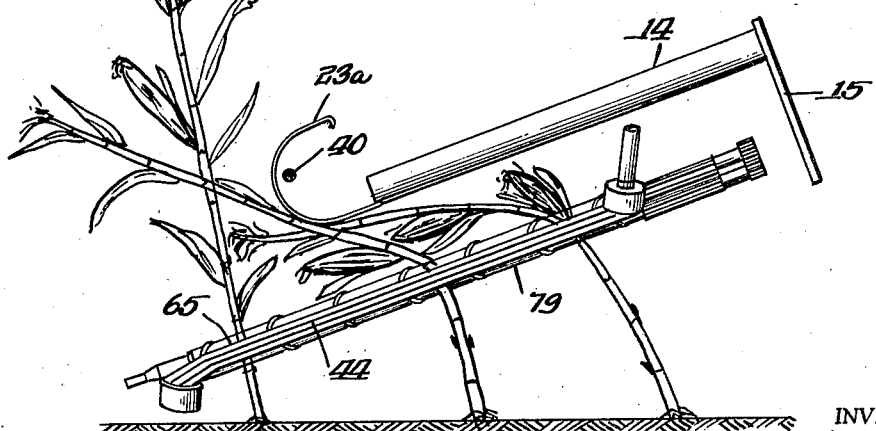
Figure 15 is a fragmentary view of some of the parts that act upon the corn stalk and with the body portion of the machine left out in order to more clearly illustrate the action that is taking place.

In addition, due to the deflector 82 (see Figures 9 and 14) the lower portion of the corn stalk is directed between the snapping roll and the feed roll. This feed roll 79 has a higher or heavier spiral on it than the spiral on the snapping roll 65 which latter spiral is relatively shallow. Therefore, the feed roll will bite into the stalk with a greater pulling-down action, which means that the combined action of the snapping roll and feed roll on the corn stalk will give the latter a major pulling-down action which will bring the corn stalk down more quickly so that the butt end of the ear will come more quickly into contact with the pinch bar and snapping roll.

At the same time as all this is happening, a shield 23a (see Figures 12 and 13) on the forepart of the machine contacts the upstanding corn stalks and bends them forwardly so as to compel the ears on the corn stalks to register in the horizontal plane of the husking and snapping chamber. Therefore, as the machine continues to move forwardly these ears will be registered with the horizontal plane of the snapping chamber and the pulling-down action between the pinch bars and the snapping roll and between the snapping roll and the feed roll will serve to cause the snapping to take place in the husking and snapping chamber. Then, as the stalk continues to move rearwardly relatively to the feed roll and snapping roll, the stalk will be pulled downwardly through the snapping roll and feed roll and in addition broken stalks will be moved rearwardly until they contact the lugs 97 and 100 which positively pull downwardly and eject the broken corn stalks from the machine.

The radially disposed lugs 98 and 100' are arranged to take care of any corn stalks which become lodged between the feed roller in a direction longitudinally of the axis of the roll. These lugs cause such broken corn stalks to be positively discharged from the machine.

Thus, it will be seen that the ear of corn will come in contact with comparatively smooth surfaces which permits the feeding roll to be roughly ribbed to positively move the stalks. Additional lugs may be added to the feeding roll 79 when necessary.

This arrangement of the various parts reduces shelling of the kernels to a minimum, yet provides for the positive feeding and ejection of the corn stalks from the machine. In addition, the construction causes stalks to be moved rearwardly until the stalk guide 82 diverts the stalk to the side and over the end of the stalk diverting roller 84, thus providing space for the kernel pan 120 which collects shelled kernels which fall from the husking and snapping means. From this pan 120 the kernels move onto the conveyor 102.

After the ears are snapped off they slide from the husking chamber onto the conveyor 102. The ears and kernels are discharged from the conveyor 102 and fall through the air blast which removes the loose leaves and stalks. The cleaned corn falls on the slide 130 and from thence slides into the wagon elevator 131 from which the corn is discharged into a wagon which is trailed behind the tractor.

Under certain conditions a stalk diverting roller may be stationary or dispensed with entirely, if the edge of the pan 120 is slightly rounded.

Numerous changes may be made in the form, construction and arrangement of the parts without departing from the spirit of the invention or sacrificing any of its attendant advantages, and the right is hereby reserved to make all such changes as fairly fall within the scope of the following claims:

Having thus described my invention, what I claim as new and desire to secure by Letters Patent is:

1. In a device of the class described in combination with a carriage movable transversely of upstanding stalks and other crop bearing plants, elongated snapping and husking means mounted on said carriage, an elongated snapping and husking roll mounted on said carriage in opposition to said first mentioned snapping and husking means, a feed roll mounted on said carriage in opposition to said snapping and husking roll and mounted more or less below said snapping and husking roll, and guide means for guiding the upstanding stalks between the front end of said first mentioned snapping and husking means and said snapping and husking roll and for guiding an upstanding portion of said stalk or plant between said first mentioned snapping and husking means and snapping and husking roll and between said snapping and husking roll and said feed roll.

2. In a device of the class described in combination with a carriage movable transversely of upstanding stalks and other crop bearing plants, an elongated pinch bar set mounted on said carriage, an elongated snapping roll mounted on said carriage in opposition to said pinch bar set, a feed roll mounted on said carriage in opposition to said snapping roll and mounted more or less below said snapping roll, stalk diverting means mounted on said carriage laterally of said feed roll, guide means for guiding the upstanding stalks between the front end of said pinch bar set and said snapping roll and between said snapping roll and said feed roll, said guide means extending from said stalk diverting roll to and connecting with the front end of said feed roll, said guide extending beyond said snapping roll in the direction of said pinch bar set and arranged to guide the plant or stalk between said snapping roll and said feed roll and thence for bending the stalk or plant over said stalk diverting roll.

3. In a crop gathering machine in combination with a carriage movable transversely of upstanding crop bearing stalks or plants, a plurality of means at least one of which is power driven, said means receiving the upstanding stalk or plant therebetween and said means being relatively movable for removing the crop therefrom, and a feed roll disposed in opposition to one of said crop removing means and driven in synchronism with said one of said crop removing means for pulling the stalk or plant relatively to and through said crop removing means.

4. In a crop gathering machine for gathering crops from upstanding stalks and plants in the ground, the combination of relatively movable spaced snapping and husking means adapted to be propelled relatively to the ground and to receive the standing stalks or plants therebetween, means for actuating said spaced snapping and husking means for both snapping the crops from said standing stalks and plants and for also husking the snapped crops, actuable stalk feeding means disposed on the discharge side of said snapping and husking means and operable on said stalk or plant to pull the same downwardly through said snapping and husking means as the latter is operated whereby to assist in separating the crop from the stalk.

5. In a crop gathering machine for gathering crops from upstanding stalks and plants in the ground, the combination of relatively movable spaced snapping and husking means propelled relatively to the ground and adapted to receive therebetween the standing stalks or plants, one of said snapping and husking means comprising a power driven roll, means for actuating said spaced snapping and husking means for both snapping the crops from said standing stalks or plants and for also husking the snapped crops, and a rotatable stalk feeding roll disposed with its periphery contiguous to said snapping and husking roll and in position to receive the stalk of the crop to be snapped by said snapping and husking means and to pull downwardly on said stalk whereby to carry out the snapping operation.

6. In a crop gathering machine for gathering crops from upstanding stalks and plants in the ground, the combination of relatively movable spaced snapping and husking means adapted to be propelled relatively to the ground and to receive the standing stalks or plants therebetween, means for actuating said spaced snapping and husking means for both snapping the crops from the standing stalks or plants and also for husking the snapped crops, actuatable stalk feeding means disposed at the discharge side of said snapping and husking means and cooperating with one of said snapping and husking means to cause that portion of the stalk below the stalk portion engaged by the said snapping and husking means to be pulled downwardly through said snapping and husking means to effect the snapping of the crop from said stalk or plant, said stalk feeding means being disposed relatively to said snapping and husking means so as to deflect laterally somewhat horizontally, that portion of the stalk or plant immediately beneath the snapping and husking means, and additional stalk diverting means disposed laterally of said stalk feeding means and adapted to engage that portion of the stalk issuing from the stalk feeding means to divert said portion in a substantially horizontal direction laterally of the stalk feeding means.

7. In a crop gathering machine for gathering crops from upstanding stalks and plants in the ground, the combination of relatively movable spaced snapping and husking means adapted to be propelled relatively to the ground and to receive the standing stalks or plants therebetween, means for actuating said spaced snapping and husking means for both snapping the crops from the standing stalks or plants and also for husking the snapped crops, actuable stalk feeding means disposed at the discharge side of said snapping and husking means and cooperating with one of said snapping and husking means to cause that portion of the stalk below the stalk portion engaged by the said snapping and husking means to be pulled downwardly through said snapping and husking means to effect the snapping of the crop from said stalk or plant, said stalk feeding means being disposed relatively to said snapping and husking means so as to deflect laterally somewhat horizontally, that portion of the stalk or plant immediately beneath the snapping and husking means, additional stalk diverting means disposed laterally of said stalk feeding means and adapted to engage that portion of the stalk issuing from the stalk feeding means to divert said portion in a substantially horizontal direction laterally of the stalk feeding means, and means adapted to project beneath the laterally deflected portion of the stalk and beneath said snapping and husking means, said stalk feeding means and said stalk diverting means for receiving dislodged portions of the crop.

8. In a crop gathering machine for gathering crops from upstanding stalks and plants in the ground, the combination of relatively movable spaced snapping and husking means adapted to be propelled relatively to the ground and to receive the standing stalks or plants therebetween, means for actuating said spaced snapping and husking means for both snapping the crops from said standing stalks and plants and also for husking the snapped crops, a stalk feeding roll rotatably disposed at the discharge side of the said snapping and husking means and cooperating with one of said snapping and husking means to cause the stalk engaged between said snapping and husking means to be pulled downwardly through said snapping and husking means to snap the crop therefrom, said stalk feeding roll likewise serving to deflect said portion of the stalk laterally substantially horizontally, and a stalk diverting roll disposed laterally substantially horizontally from said stalk feeding roll and spaced in a generally horizontal direction from said stalk feeding roll sufficiently to permit the discharge of dislodged portions of the crop between said stalk feeding and stalk diverting rolls and conveying means disposed beneath said snapping and husking means and adapted to receive the snapped and husked crop discharged from said snapping and husking means, said conveying means having a lateral extension projecting laterally beneath said feeding roll and said stalk diverting roll to receive dislodged portions of the crop and to divert the same into said conveying means.

9. In a crop gathering machine for gathering crops from upstanding stalks and plants in the ground, the combination of spaced apart snapping and husking means, said snapping and husking means being elongated and extending in parallelism, deflecting and guiding means for deflecting the stalk between said snapping and husking means, rotatable stalk feeding means disposed immediately below one of said snapping and husking means, said stalk feeding means likewise being elongated and being disposed parallel to said snapping and husking means, means for actuating said stalk feeding means in synchronism with the snapping and husking means, stalk deflecting and guiding means disposed below said snapping and husking means and connected to the receiving end of said stalk feeding means, said stalk guiding and deflecting means being disposed at an inclination rearwardly and laterally from front to back with respect to the longitudinal axis of said snapping and husking means, and stalk guiding means associated with said snapping and husking means for diverting the upper portion of a crop carrying stalk in a longitudinal direction of and between said snapping and husking means and for laterally diverting a lower portion of said stalk laterally between one of said snapping and husking means and said stalk feeding means and means for actuating said stalk feeding means whereby to cause said means to pull the stalk downwardly between said snapping and husking means to snap the crop from the stalk.

10. An attachment to be connected to the body of a tractor which has spaced apart rear driving wheels, intermediate front steering wheel means disposed forwardly of said driving wheels, and a power take off shaft, said attachment comprising a carriage having a single wheel disposed wholly at one side thereof, said carriage including a frame adapted to extend laterally of said carriage, said frame projecting beyond the side of the carriage remote from the single wheel and terminating in a plurality of spaced extensions having detachable couplings, means pivotally connecting said couplings to the side of the tractor, spaced means on said carriage adapted to receive therebetween upstanding plants or stalks for removing the crop from said stalks or plants, said means including mechanism for snapping the crop from said stalks or plants and for husking the leaves or other trash from said crops and for discharging said leaves and trash from the carriage, said carriage likewise including means for recovering the crop and for feeding the same along the carriage to a desired point, means operatively connecting said mechanisms on said carriage with a power shaft of the tractor, said carriage being sufficiently wide in extent so that the ground wheel thereof travels in the space between adjacent rows of stalks or plants while the harvesting mechanism on the carriage harvests the crop on the row of stalks or plants which is located between the ground wheel of the carriage and the adjacent driving wheel of the tractor.

11. An attachment to be connected to the body of a tractor which has spaced apart rear driving wheels, and a power take off shaft, said harvesting attachment comprising a carriage having but a single lateral wheel adapted to support a part of the carriage from the ground during the movement of the tractor, said wheel being disposed wholly at one side of said carriage, said carriage being disposed with its wheels located in spaced relation to and laterally of the adjacent rear driving wheel of the tractor, said carriage including a frame having a lateral extension adapted to project across the intervening space between said carriage and the body of the tractor, said extension having terminal means for pivotal connection to the body of the tractor whereby said carriage is supported for rolling movement along the ground with the tractor by means of said carriage ground wheel and the pivotal connection with the tractor, relatively movable spaced snapping and husking means mounted on said carriage and adapted to receive therebetween upstanding stalks and plants disposed in a row located in the ground between said carriage wheel and adjacent tractor wheel, said means including mechanism for snapping the crop from said stalks and plants and for husking said snapped crops, and an extension shaft connected to said power take off shaft of the tractor for operating said snapping and husking means.

12. An attachment to be connected with the body of a tractor which has a body, spaced apart rear driving wheels extending laterally therefrom, intermediate front steering wheel means disposed forwardly of said driving wheels and a power take off shaft, said harvesting attachment comprising an elongated carriage adapted to be disposed substantially parallel with the longitudinal axis of the tractor and in spaced relation to one side thereof, said carriage having but a single lateral ground contacting wheel mounted thereon for supporting a part of the carriage, said carriage and wheel being disposed so that the central axes of the adjacent rear driving wheel of the tractor and of the ground contacting wheel of the carriage are substantially in line in a direction transversely of the longitudinal axis of the carriage and tractor, said carriage wheel being relatively smaller in radius compared with the radius of said tractor wheel, said carriage including an upstanding supporting extension, said extension extending laterally overlying across the body of the carriage and across the space between the carriage and the body of the tractor and having branched extensions, one having a pivotal connection to the forepart adjacent side of the tractor body, the other extension pivotally connecting to the substantially rear adjacent side of the body of the tractor, whereby pivotally to support the carriage from the ground and from the body of the tractor, and whereby said carriage is propelled by and with said tractor, and spaced means on the forepart of said carriage for receiving therebetween a row of upstanding stalks or plants in the ground, said means being disposed on said carriage laterally, in the direction of the carriage, of the path of movement of the adjacent rear driving wheel of the tractor, and crop snapping and husking means adapted to act upon crops carried by the upstanding stalks or plants for snapping crops from said stalks and plants and for husking said crops and means connected to the power take off shaft of the tractor for actuating said stalk and plant receiving means and said crop snapping and husking means.

13. A crop snapping and husking attachment for a tractor, which tractor has a chassis and spaced rear driving wheels extending laterally of the rear portion of the tractor body, and a power take off shaft, said attachment comprising a carriage disposed laterally of and in spaced relation from the adjacent rear driving wheel of the tractor, and said carriage having supporting means extending laterally to bridge the intervening space between said carriage and the body of the tractor, said carriage having a single supporting ground contacting wheel, said supporting means having pivotal connection with the tractor carriage whereby said carriage is free to pivot relatively to the tractor about substantially horizontal axes and crop snapping and husking means mounted on said carriage and adapted to receive therebetween upstanding stalks and plants disposed in a row laterally of and beyond the path of rolling of said adjacent rear tractor driving wheel, said snapping and husking means having a detachable connection with said power take off shaft of the tractor and said pivotal supporting means being disconnectable from the body of the tractor.

14. Crop treating apparatus comprising a carriage adapted to move relatively to the ground and to a row of crop carrying upstanding stalks or plants in the ground, elongated crop snapping means mounted on said carriage between which the upstanding stalks or plants are adapted to pass, said snapping means comprising a plurality of spaced apart elongated crop gripping members having their opposite ends operatively interconnected for causing said spaced apart crop gripping members to travel in the same generally elliptical path, and a rotatable roll disposed in spaced parallel opposition to the path of movement of said members, said roll being longer than said members, said roll having a spiral rib thereon, said rib terminating at the rear of said roll beyond the adjacent end of said members, in a straight radially extending elongated lug, said roll likewise having a plurality of parallel spaced apart radially disposed lugs coextensive with said first mentioned radially disposed lug, and a crop feeding roll mounted on said carriage in opposition to said first mentioned roll, said crop feeding roll having a corresponding spiral rib thereon adapted to engage the spiral rib on said first mentioned roll, said spiral rib of said second mentioned roll terminating in a straight radially disposed lug on the periphery of said second mentioned roll and substantially coextensive with the straight lugs of said first mentioned roll, there being a plurality of spaced apart radially extending straight lugs on said second mentioned roll parallel with and substantially coextensive with the straight lug portion of said second mentioned roll, said upstanding stalk or plant passing between said elongated members in said first roll and between said first and second roll.

WILLIAM E. URSCHEL.